US010130904B2

(12) United States Patent
Klass et al.

(10) Patent No.: US 10,130,904 B2
(45) Date of Patent: Nov. 20, 2018

(54) SCREW FILTER PRESS

(71) Applicants: Georg senior Klass, Turkenfeld (DE); Georg junior Klass, Turkenfeld (DE)

(72) Inventors: Georg senior Klass, Turkenfeld (DE); Georg junior Klass, Turkenfeld (DE)

( * ) Notice: Subject to any disclaimer, the term of this patent is extended or adjusted under 35 U.S.C. 154(b) by 942 days.

(21) Appl. No.: 14/628,371

(22) Filed: Feb. 23, 2015

(65) Prior Publication Data

US 2015/0209703 A1    Jul. 30, 2015

Related U.S. Application Data

(63) Continuation of application No. 13/063,479, filed as application No. PCT/IB2009/007350 on Sep. 11, 2009, now Pat. No. 8,985,011.

(30) Foreign Application Priority Data

Sep. 12, 2008  (DE) ........................ 10 2008 046 928

(51) Int. Cl.
| | |
|---|---|
| *B30B 9/12* | (2006.01) |
| *B01D 29/90* | (2006.01) |
| *B01D 29/11* | (2006.01) |
| *B01D 29/64* | (2006.01) |

(52) U.S. Cl.
CPC ............ *B01D 29/90* (2013.01); *B01D 29/117* (2013.01); *B01D 29/6476* (2013.01); *B30B 9/121* (2013.01); *B30B 9/125* (2013.01); *B30B 9/127* (2013.01); *B30B 9/128* (2013.01)

(58) Field of Classification Search
CPC .... B30B 9/18; B30B 9/14; B30B 9/00; B30B 15/00; B30B 3/04; B30B 9/128; B30B 9/121; B30B 9/125; B30B 9/127; B30B 9/26; B01D 35/00; B01D 29/88; B01D 29/90; B01D 29/117; B01D 29/6476
USPC ... 100/48, 49, 117, 145, 146, 147, 148, 149, 100/150; 210/128, 129, 415, 446
See application file for complete search history.

(56) References Cited

U.S. PATENT DOCUMENTS

| | | |
|---|---|---|
| 3,126,818 A | 3/1964 | Koelsch |
| 3,688,687 A | 9/1972 | Craig et al. |
| 4,397,231 A | 8/1983 | Burgin |

(Continued)

FOREIGN PATENT DOCUMENTS

| | | |
|---|---|---|
| AT | 411 892 B | 12/2003 |
| CH | 579 895 | 9/1976 |

(Continued)

OTHER PUBLICATIONS

English Translation of JP-1985-60-255300.

*Primary Examiner* — Jimmy T Nguyen
(74) *Attorney, Agent, or Firm* — Fitch, Even, Tabin & Flannery LLP

(57) ABSTRACT

A screw filter press comprising a screw shaft, having at least one coil turn and two screw shaft ends. The shaft axis is parallel to the gravity vector and is supported by screw shaft upper end connected to a rotary drive. The screw shaft is enclosed a filter area by a cylindrical filter tube, with openings and which is adjacent radially to a filtrate space, to which underpressure is applied. The sliding tube radially surrounding the screw shaft is the same inner diameter as the filter tube. Radial play occurs between at last one coil turn adjoining the filter tube proximate to the filter tube inner wall.

23 Claims, 5 Drawing Sheets

(56) References Cited

U.S. PATENT DOCUMENTS

| | | | |
|---|---|---|---|
| 4,859,322 A * | 8/1989 | Huber | B01D 29/035 210/162 |
| 5,034,128 A * | 7/1991 | Hillstrom | D21C 9/18 162/56 |
| 5,110,461 A * | 5/1992 | Abel | B01D 29/014 210/158 |
| 5,122,263 A * | 6/1992 | Huber | B01D 29/118 100/117 |
| 5,372,713 A * | 12/1994 | Huber | B01D 21/0012 210/158 |
| 5,857,405 A | 1/1999 | Bischof | |
| 5,960,711 A | 10/1999 | Nordin | |
| 6,187,180 B1 | 2/2001 | Bruke | |
| 6,634,508 B1 | 10/2003 | Ishigaki | |
| 8,985,011 B2 * | 3/2015 | Klass, Sr. | B30B 9/12 100/117 |
| 2007/0119313 A1 | 5/2007 | Hamano et al. | |

FOREIGN PATENT DOCUMENTS

| | | |
|---|---|---|
| DE | 102005 002997 A1 | 7/2006 |
| DE | 202007 007 038 U1 | 10/2007 |
| EP | 0 700 639 A1 | 3/1996 |
| JP | 60255300 A | 12/1985 |
| JP | 9-1389 | 1/1996 |
| JP | 9-10522 | 1/1997 |
| WO | 9815336 | 4/1998 |

* cited by examiner

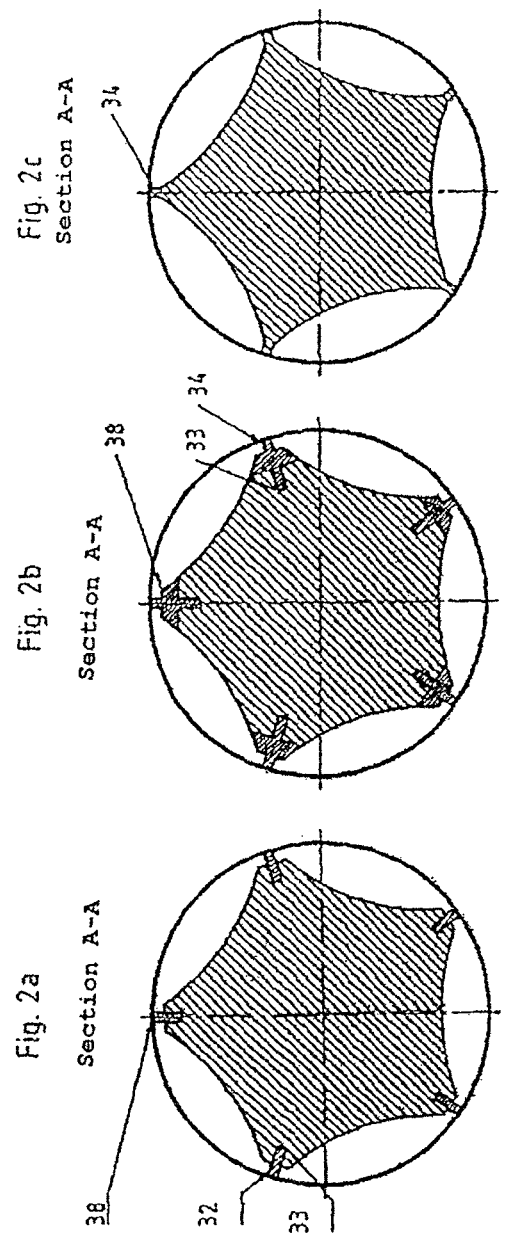

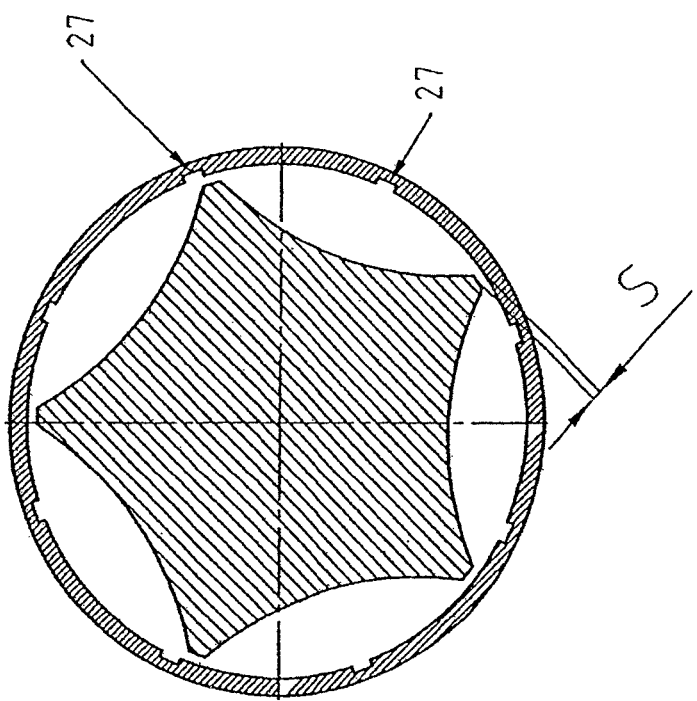
Fig. 2d Section B-B

SCREW FILTER PRESS

CROSS REFERENCE TO RELATED APPLICATION

This application is a Continuation of U.S. application Ser. No. 13/063,479, filed on Mar. 11, 2011, which application is incorporated herein by reference in its entirety.

BACKGROUND OF THE INVENTION

Field of the Invention

The invention relates to a screw filter press, which is vertically arranged in the space, in which a suspension of finely distributed solid matter is accommodated in a liquid (so-called suspension) with the help of a screw shaft, which is supported and driven on one side at the upper shaft end and which encompasses at least one, but preferably two or more coil turns or "coils" in short, from a supply tube located on the bottom and is supplied to the top along the coils, wherein the solid matter reaches upwards to the discharge opening as solid cake along the coils, while the liquid discharges into a filtrate space via a cylindrical filter tube, which coaxially surrounds the screw shaft at least in a lower partial area, and is sucked off from there.

Description of the Prior Art

A screw filter press of the above type is known from DE 10 2005 002 997 A1. In the case of this known screw filter press, in the case of which the screw shaft is driven on top by means of a motor and in the case of which the screw shaft is supported on one side on the top below the motor, the cylindrical filter tube reaches into the level of the discharge opening and the screw shaft encompasses a play of 0.1 to 0.3 mm to the cylindrical filter tube on the entire length.

Furthermore, the screw shaft with the filter tube reaches virtually to the bottom of the inlet or the inlet tube, which is arranged at the lower end of the screw shaft. The disadvantage of this known screw filter press is that the openings of the filter tube close after a relatively short time, because the coil bars or flanges, wear out, because solid matter, such as sand, deposits at the bottom of the inlet and thus block the entire inlet, and that the filter cake accumulates easily in the upper part of the coils or the filter cake clumps.

A further disadvantage is that larger pieces, such as rocks, are spun upwards by the suction of the suspension in the lower part of the inlet tube and reach into the coils, which leads to damages to the coils and to the filter tube.

A further comparable screw press can be found in AT 411 892 B, which provides for specifically embodied coil flange attachments, which are to prevent an adhesion or clogging of the dewatering openings, which are provided in the filter tube.

SUMMARY OF THE INVENTION

The invention overcomes the disadvantages of the known screw filter press and is a screw filter press with small technical effort, in which a high dry substance content, which can be regulated, as well as a high throughput of solid matter are possible. A pre-separation of coarse solid matter is furthermore possible in the suspension supply, so as to ensure an interruption-free operation.

According to the invention, a screw filter press, as in DE 10 2005 002 997 A1, comprises a screw shaft, which has at least one coil turn and two screw shaft ends, the shaft axis of which is oriented parallel to the gravity vector and which is supported on one side via the upper screw shaft end thereof and which is connected to a rotary drive and which is coaxially surrounded by a cylindrical filter tube, which is provided with openings, at least in its lower partial area in a filter area, to which filter tube a filtrate space adjoins radially to which underpressure can be applied. A sliding tube radially surrounds the screw shaft in the direction of the upper screw shaft end in a fluid-tight manner, follows coaxially to the filter tube at the same inner diameter as the filter tube, with the sliding tube corresponding to a cylindrical sliding area. The at least one coil turn of the screw shaft ends radially to the screw shaft in a flange, which revolves helically around the screw shaft and adjoins the filter tube in the area of the filter tube either indirectly or directly at the inner wall.

By arranging a cylindrical sliding tube and a sliding area to have the same inner diameter as the filter area, the solid cake is supplied to the discharge opening without a constriction. The length of the sliding area, which preferably corresponds to approximately half of the length of the filter area, as well as play, which is preferably available between the outer flanges of the coils and the inner diameter of the sliding area, which causes the solid cake to attain a certain consistency to form a block against the penetration of air from the outside and that the solid cake does not clump in the sliding area in the coils.

The wiping of the solid matter takes place in an optimal manner by preferably arranging abrasion-resistant, elastic elements at the outer flanges of the coils, which are inserted into the filter tube under low prestress. In addition, the elastic elements form the outer flanges with a sliding transition to the coils. The solid matter does not accumulate at any flange and the drainage of the solid matter is not impeded.

The embodiment of the actual wiping lip with a width of 1-3 mm and a height of 2-5 mm has proven to be particularly advantageous. Due to the fact that the elastic lip is made of polyurethane (so-called cell vulcollan). The elasticity of the material in the case of these dimensions has a particularly favorable impact on the wiping effect and the service life of the lips is accordingly long.

For a start, a production of the elastic elements as prefabricated individual parts, which are glued into grooves at the outer flange of the coils or which are connected to the outer flange of the groove via adhesion, represents a method, which is simple to manufacture and which allows the production of cost-efficient elastic elements. On the other hand, the adhesion into the grooves ensures the discharge, which is required for the solid cake, because the flow of the solid matter along the coils is not impeded.

A radial play of 0.1 to 0.3 mm in the sliding area ensures that a clumping of the solid matter in response to a set speed and the underpressure applied at the filtrate space does not take place on the coils or in the sliding area.

The consistency of the solid matter stopper can be changed in the sliding area by changing the speed of the screw shaft and/or by changing the underpressure in the filtrate space, so as to attain an optimal solid cake.

In the start-up phase, in which solid matter has not yet been separated into the grooves, the applied underpressure to the filtration is already effective, because the same liquid level is attained in the sliding area by the liquid level in the catch basin via the tube bank. The description of a filter arrangement is explained in more detail in FIG. 3.

The screw filter press has the advantage that the initially empty coil grooves can quickly fill with a solid matter stopper in response to the start-up, because external air cannot reach into the suction space via the filter tube in the filled state, even in response to a low liquid level in the catch basin. The operational underpressure thus adjusts immediately and the differential pressure between atmosphere and underpressure in the suction space acts on the solid matter stopper as dewatering pressure.

The solid matter stopper better overcomes the force created for escaping towards the top. Conveying grooves are within the inner wall of the sliding tube, which, in addition to the drainage, form an additional resistance in a peripheral direction of the coils and thus favor the solid matter transport through the coil bar, which is beveled at an angle of preferably 45° upwards opposite to the pressing direction. In principle, angles between 20° to 60° are suitable for the coil pitch. However, pitch angles of between 30° and 50° are particularly preferred for the coil turn.

The solid throughput can thus be increased in the case of the same coil grooves. When the suspension has a lower solid matter content, the lower solid matter transport, which is required, can be adapted to the demand by reducing the speed.

By arranging a supply line or a tube bank and the screw shaft nozzle, which projects into it, as well as by a back and forth suspension flow in the tube space of the supply due to the level-controlled catch basin, the suspension is kept homogenous and it is possible for larger solid matter to be retained in the supply line or in the tube bank, thus leading to a large operational dependability. This tube space can be inspected and can be cleaned, if necessary, by means of the shut-off valves, which are arranged at the respective ends.

A coil pitch of the screw shaft in a range of from 30°-50° has a positive impact on the separation and conveyance of such suspensions.

The use of an odd number of coils has a positive impact on the assembly of the screw shaft into the filter tube, because the elastic elements, which are inserted into the filter tube under a small prestress, thereby do not directly face one another.

The fact that the collar of the screw shaft is embodied as part of the claw coupling and the counterpart of the claw coupling is attached to the motor as a hub, results in a reliable, simple coupling, which mainly considers the scarce space.

BRIEF DESCRIPTION OF THE DRAWINGS

The invention will be described in an exemplary manner below by means of exemplary embodiments with reference to the drawings without limiting the general idea of the invention.

FIG. 2a shows a flange embodiment of the coils in the filter area in cross section along section A-A in FIG. 1;

FIG. 2b shows an alternative flange embodiment of the coils in the filter area along section A-A in FIG. 1;

FIG. 2c shows a further alternative flange embodiment of the coils in the filter area provided with the screw shaft being polyurethane, called cell vulcollan, along section A-A in FIG. 1;

FIG. 2d shows the flange embodiment of the coils and of the conveying grooves in the sliding area along section B-B in FIG. 1;

DETAILED DESCRIPTION OF THE INVENTION

Figure 1:
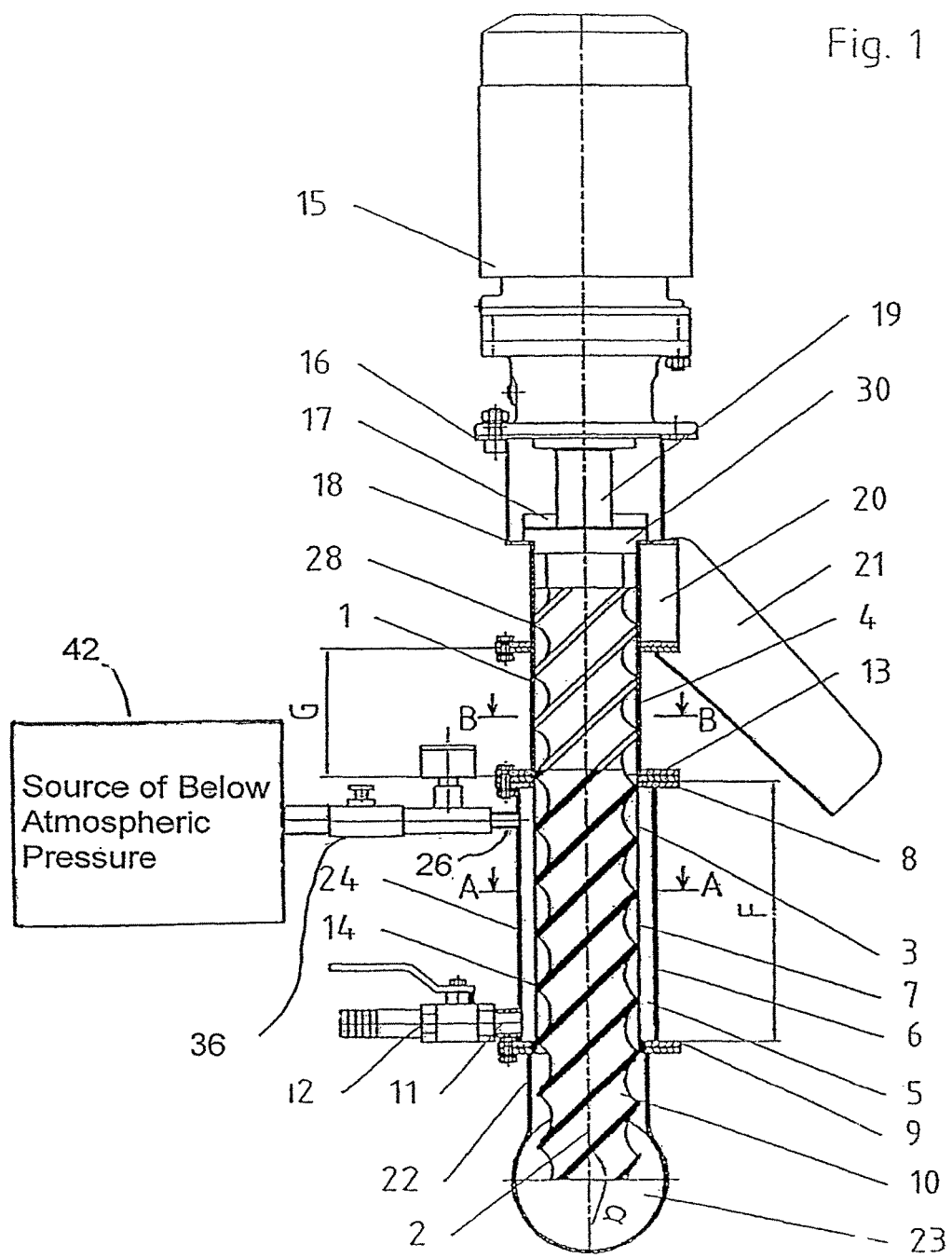
FIG. 1 shows a longitudinal section through a screw filter press according to the invention, which stands upright.

A drivable screw shaft 10 standing upright, that is, parallel to the acting gravity, is coaxially arranged in an upright housing 1 comprising a center axis 2.

The housing, which is arranged to be upright, has a plurality of parts, wherein the individual parts are connected to one another via flanges. The lower part 24 of the housing encompasses a larger outer diameter than the upper part 28 of the housing, which is flange-mounted thereon. In the lower housing part 24, the filter tube 3 is arranged coaxially to the screw shaft 10. The filtrate space 5 is located between filter tube 3 and housing inner wall 6.

The lower housing part 24, in which the filter tube 3 is held between the upper and lower housing flanges 8, 9, where the filtrate drains through the filter tube, will also be referred hereinbelow as filter area F. The upper flange 8 is embodied as fixed bearing for holding the filter tube, while the housing flange 9 only prevents a radial displacement of the filter tube 3.

If necessary, the filter tube 3 has openings ranging from 0.05 to 1 mm, so that the liquid of the suspension can drain through the openings of the filter tube 3 into the filtrate space 5 between housing inner wall 6 and filter tube outer wall 7.

The filter tube 3 can be a perforated plate, wherein the through holes are open towards the housing inner wall 6. The filter tube 3, however, can also be a cylindrical disk filter with openings which also open towards the housing inner wall 6, thus opening conically or in a funnel toward the housing inner wall. This embodiment of the hole has the advantage that the holes themselves virtually do not clog.

The filtrate space 5, which is formed between housing inner wall 6 and filter tube outer wall 7 is defined upwards by the flange 8, which is connected to the housing 1 and which is embodied as described.

The filtrate space 5 is defined downwardly by the housing flange 9, in which the filter tube 3 is supported such that it cannot displace radially. Above the housing flange 9, a filtrate drain nozzle 11, through which the liquid of the suspension drains from the filtrate space 5 or is pumped off, is attached laterally.

In terms of this description, a suspension is understood to be a suspension of finely distributed solid matter in a liquid, such as it is present in so-called slurry or so-called manure, e.g.

The filtrate drain valve 11 can be closed by a valve 12, such as a ball valve.

A sliding tube 4 is attached with its lower tube flange 13 onto the flange 8, which defines the filtrate space 5 upwardly towards the drive motor/rotary drive 15 located on the top, and is connected to the flange 8, by screws.

The longitudinal axis of the attached sliding tube 4 and the longitudinal axis of the screw shaft 10 are congruent with the center axis 2. The inner diameter of the filter tube 3 and the inner diameter of the sliding tube 4 are also equal so that the filter area F and the sliding area G have the same inner diameter.

The upper part of the housing 28 is defined upwardly by means of a plate 18. The discharge opening 20 for the solid matter of the suspension is located below the plate 18. The coils 14 of the screw shaft 10 end at a distance to the plate 18. The screw shaft 10 itself, which encompasses a collar 30 at the end, is guided up to the drive shaft of the drive motor 15, by an electric motor, and is connected thereto in a rotary manner, by a hub 19, which supports the coupling 17 at the lower end.

The screw shaft 10 preferably encompasses two or more coils 14. An odd number of coils is particularly advantageous. A number of five has proven to be particularly advantageous in tests. It goes without saying that the number of coils depends on the diameter of the screw shaft. The diameter was 75 mm in tests.

In the exemplary embodiment, the screw shaft 10 thus has five coils 14 with a diameter of 75 mm comprising a coil pitch of preferably 45°. The coil pitch α should preferably be in a range of from 30° to 50°.

The screw shaft 10 is driven via a drive motor 15. The drive motor 15 is connected to the screw shaft in peripheral direction via a coupling 17, such as a claw coupling (not illustrated in detail).

The attachment of the drive motor 15 takes place on the support plate 16, which is also located on top by screw bolts. The support plate is attached to the housing 1, which stands upright, above the support of the screw shaft.

The support of the screw shaft, which accommodates axial as well as radial forces, is integrated into the plate 18 of the upper housing part.

The support plate 16, to the upper side of which the motor 15 is attached, encompasses a distance to the plate 18, which is used to connect or couple the screw shaft to the motor.

A discharge opening 20 is arranged at the upper end of the upper housing part. A chute 21, on which the solid matter is conveyed to the discharge openings, glides into a catch basin (not illustrated), and is connected to the discharge opening.

The supply of the suspension takes place via a housing nozzle 22, which is flange-mounted to the housing flange 9 of the lower housing.

Figure 3:
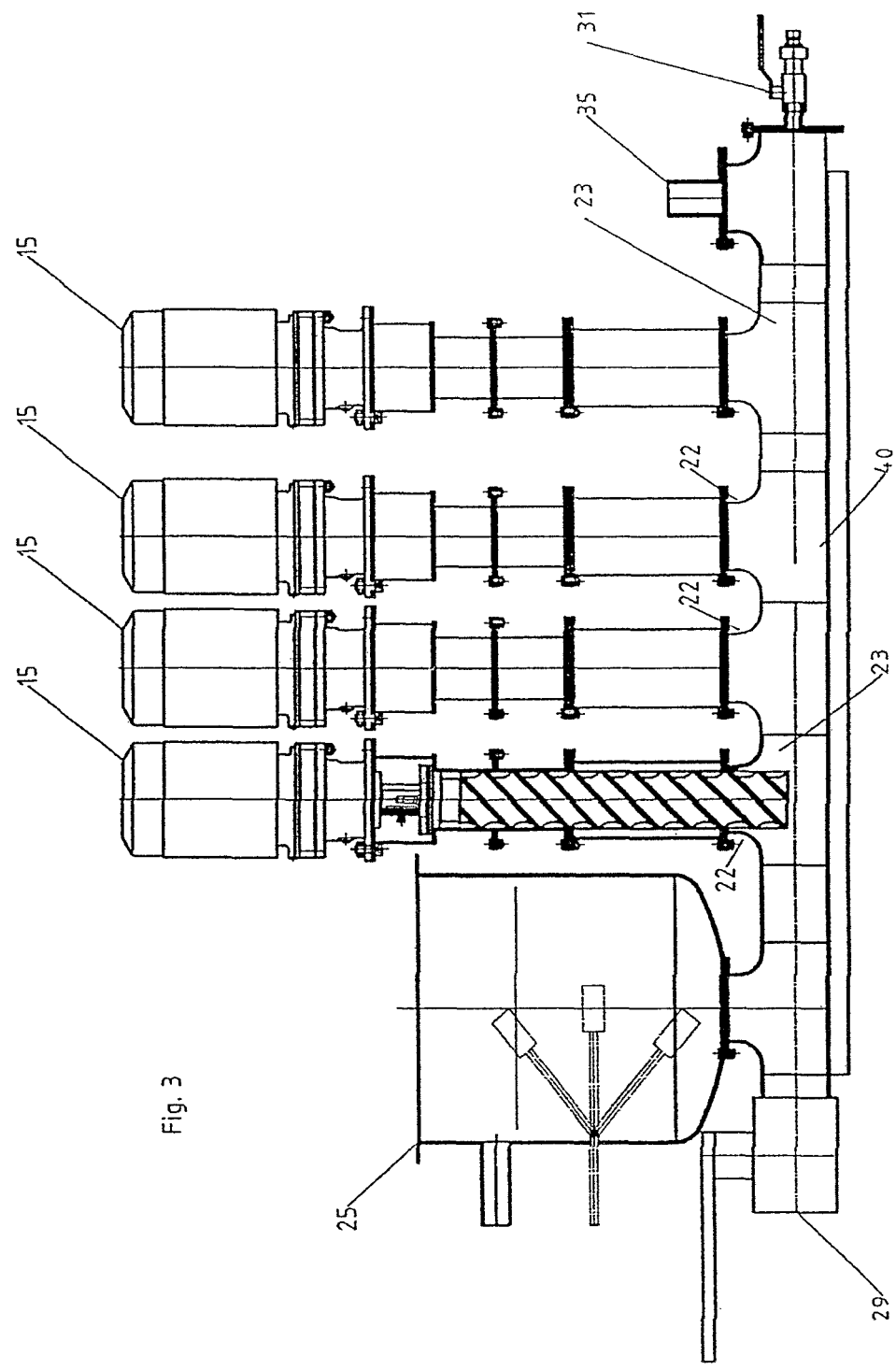
FIG. 3 shows an attachment comprising four screw filter presses, which are connected in series and connected to a tube bank.

The housing nozzle is molded such that the screw shaft 10 reaches approximately into the center of the tube-shaped supply line 23 or tube bank 40, through the part, which is directly connected to the lower housing as shown in FIG. 3. In the area of the supply, the supply line 23 together with the housing nozzle is a one-piece part, to which the supply line parts are welded or flange-mounted (not illustrated).

In the event that a screw filter press is used, the one side of the housing nozzle serves as connection to the supply line and the side located opposite thereto serves to couple the tube into a level-maintaining catch basin 25, which ensures the adherence to the maximum and minimum level in the housing of the screw filter press by means of level regulators. The inflow line to the catch basin is connected to the housing nozzle coaxially in the horizontal direction and encompasses a shut-off valve 29 or a drain opening for the supply line. Located opposite thereto, is the inlet of a flushing tube 31 as shown in FIG. 3.

In the event that a plurality of screw filter presses are arranged in series, the horizontal sides of the housing nozzles are connected to in a tube bank 40 by welding and the screw filter presses are flange-mounted to the vertical connections (see, in particular FIG. 3). A level regulation is arranged herein as in the case of an individual screw filter press, which must be dimensioned accordingly. Provision is also made for a flushing tube 31 and a shut-off valve 29. The supply of the suspension takes place via the nozzle 35.

Due to the level regulation, a flow is created in the supply line or in the tube bank which ensures that the suspension is always mixed evenly. However, larger foreign particles, which are significantly heavier, remain in the lower part of the supply line or in the tube bank.

Due to the fact that the screw shaft only reaches approximately into the center of the supply line or the tube bank, coarse solid matter can deposit at the bottom of the supply line and does not reach into the area of the screw shaft. The deposits can be removed from time to time by means of the flushing tube 31 via the shut-off valve 29.

If necessary, the screw shaft 10 is driven by an electric, pneumatic or hydraulic speed-controlled motor. The speed lies in the operating range from 30 to 100 rpm.

On the drive side, a secondary transmission or a stepped transmission can be provided for reaching the speed. A gear motor can also be used. A claw coupling is used as coupling or if necessary, an adjustable overload coupling.

The filter tube 3 is made of metal and the holes are carved by laser methods, for example, in the desired shape, generally with a larger hole cross section towards the housing inner side 6.

A cylindrical disk filter can also be used instead of a filter tube. The screw shaft is only supported on one side on the top in the support plate and does not get damaged in response to making contact with the filter tube. The screw shaft or the coils thereof are made of plastic.

In the vertical direction, the screw filter press, which stands upright, can roughly be divided into two areas, which must substantially fulfill two different objects.

The lower housing comprising the cylindrical filter tube can be identified as filter area and the upper housing area up into the level of the discharge opening can be identified as sliding area G. The filter area F is approximately twice as high as the sliding area G.

The rotating screw shaft 10 conveys the suspension out of the supply line 23 or the tube bank 40 and the suspension moves upwards along the coils. The liquid is hereby separated from the solid matter. That is, the liquid drains into the filtrate space through the openings of the filter tube 3. The rotation of the screw shaft thus also causes solid matter to be hurled against the inner wall of the filter tube.

The flanges of the coils must in this area keep the inner wall of the filter tube free. This takes place by the flanges scraping the solid matter, so that the solid matter is further conveyed to the discharge opening, and the solid matter forms a solid cake by removing liquid.

With an increase in dehumidification, the solid cake tends to settle on the coil. In the sliding area, in which a solid cake has already formed, the slidability of the solid cake is most important and a further high dehumidification can even cause the solid cake to clump.

The screw shaft in the sliding area thus has the sole object of conveying and it fulfills this task, provision is made for a play 5 between 0.1 and 0.3 mm the inner wall of the sliding tube and the outer flange of the coils, so that the coils of the screw shaft do not abut on the inner space of the sliding tube in the sliding area as shown in FIG. 2d.

In the filter area, however, the coil flanges remove the solids from the inner side of the filter tube 3, so that the drainage of the liquid is not impeded.

FIGS. 2a-c show three different possibilities for embodying the elastic elements 38 at the coil flanges. FIG. 2a shows the insertion of a strip 32 into a groove 33. The strip is an abrasion-resistant and elastic material, such as polyurethane.

Another possibility for embodying the flanges is shown in FIG. 2b. The flanges of the coils are turned here as well and a profile is attached to the flange surface, either into a groove, or is adhered to the planar surface. The profile of the flange pointing towards the filter tube, for example, encompasses an attachment 34, which is approximately 2 mm wide and 3 mm high. The profile, like the strip, is the elastic, abrasion-resistant polyurethane.

FIG. 2c shows an attachment 34 to the coils as in FIG. 2b. In the case of the screw shaft illustrated in FIG. 2c, the entire screw coil is made of polyurethane (called vulcollan) or at least the part of the screw coil in the filter area is made of polyurethane. In the sliding area a play of from 0.1-0.3 mm exists between coil flange and inner surface of the sliding tube in the event that the entire screw shaft is made of polyurethane.

The embodiment of the flange coils in the filter area in the case of the described alternatives is always the same in dimension. For instance, the width of the flanges lies between 1-3 mm; the height lies between 2-5 mm.

The mentioned material is vulcollan, which is a polyurethane, which is foamed with water, which has highly-dynamic characteristics. Cellular vulcollan allows for approx. 80% compression in response to small cross expansion and a minimal remaining deformation. See form list edition 1992 of Paul Pleiger, Maschinenfabrik GmbH+ Co.KG, Im Hammertal 51, 58456 Witten 3.

Due to these physical characteristics, the screw shaft 10 is inserted into the filter tube 3 in the filter area under slight prestress. It has thus proven to be particularly advantageous for the installation to use an odd number of coils, e.g. 3, 5, 7.

As was already described, the solid matter is conveyed upwards to the discharge opening 20 by the coils 14. A solid cake forms thereby, which becomes increasingly solid with increasing travel upwards.

To accelerate the formation of the solid matter cake, the underpressure, which is created by draining the filtrate, is regulated via the connection 26 via a valve 36. In response to a constant underpressure of approx. 0.5 bar, which is set at the valve 36 from an external source of underpressure below atmospheric pressure 42 and which acts on the suspension, liquid is not only removed from the suspension to a higher extent, but liquid is also removed from the solid cake in the sliding area.

A constant underpressure below atmospheric pressure (e.g. 0.5 bar) has only been reached after the start-up phase when a solid cake has formed in the sliding tube 4, so that the air inflow from the area of the discharge opening 20 is reduced, even almost eliminated.

Due to the removal of liquid, the solid cake often tends to form clumps. This can lead to the clogging of the individual coils.

The sliding tube for conveying grooves 27 prevents the formation of clumps and provides a firm link of the solid cake to the coils, in particular the coil base. See FIG. 2d.

In the exemplary embodiment, eight conveying grooves 27 are in longitudinal direction. These conveying grooves counteract the clogging of the coils and increase the solid matter discharge. They can also be embodied in a spiral-shaped or helical manner instead of as upright conveying grooves.

FIG. 3 shows a filter arrangement comprising four screw filter presses, which are connected in series.

The suspension is supplied to the four screw filter presses via a supply line 23 in a tube bank 40. In the event that the four screw filter presses cannot drain the quantity, which is supplied by a pump, the excess is pumped into the catch basin 25. This catch basin is equipped with a level regulation, so that a maximum level and a minimum level are defined.

The suspension is always in motion in the tube bank by this level regulation. On the one hand, it flows towards the catch basin, on the other hand, it flows from the catch basin back to the supply line so that the suspension is thus always mixed.

The maximum level reaches approximately into the lower half of the sliding tube 4. The minimum level lies in the lower area of the filter tube. Due to the fact that the screw shaft 10 accommodates suspensions only from the upper half of the supply line 23, it is ensured that larger solid matter, which can lead to damages, cannot reach the coils.

In the event that solid matter should accumulate in the supply line or the tube bank over time, they can be removed via the shut-off valve 29, which is connected to the inlet.

The suspension is guided upwards along the coils, wherein the speed of the screw shaft is increased or reduced, depending on the solid matter content, and/or the underpressure is increased. The speed and the underpressure are always changed such that the desired consistency is reached in the solid cake.

On its way upwards, the separation of solid matter and liquid is carried out to the provided extent. When the solid matter has reached the discharge opening 20, it is discharged and the liquid is pumped off via the filtrate drain nozzle 11.

The coils of the screw shaft 10 preferably encompass a pitch of between 30° and 50°. A pitch of 45° has proven to be particularly advantageous.

In the event that a suspension comprising approx. 3% of solid matter content is supplied via the housing nozzle 22 in the case of a screw filter press as illustrated in FIG. 1, the suspension is guided upwards along the coil turns. The liquid of the suspension is filtered through the filter tube 3 and reaches into the filtrate space 5. The filtrate drains from there or it is pumped off.

At the onset of the supply of the suspension, the screw shaft 10 is made to rotate at approx. 50 to 60 rpm by means of the drive motor 15 so that the coil turn and the direction of rotation of the motor are oriented in the same direction, provided that a reverse gear is not connected in-between.

The grooves between the coils are such that the coils of the screw shaft initially press the solid matter against the filter tube over and over and subsequently against the tube inner wall of the tube 4, and attempt to convey the solid matter towards the discharge. It is thus important that the embodiment of the groove spaces between the coils accumulates solid matter and the dwell time of the solid matter in the coils of the screw shaft can be adapted to the requirements, which is why a speed was chosen in a low range of approx. 50 rpm or why the underpressure is intensified. The type of suspension must be considered in response to the selection of the screw shaft as well.

In a test facility, the screw shaft had five coils in response to a total diameter of the screw shaft of 75 mm. The filter tube had a hole size of 0.1 mm. The height of the filter area F, from housing flange 9 to flange 8 was 200 mm. The height of the sliding area G was approx. 100 mm. The screw shaft was rotated at approx. 50 rpm. The ejected solid matter pellets had a moisture content of approx. 75%. The underpressure in the filtrate space was approx. −0.4 bar.

The diameter of the coaxially arranged cylindrical sliding tube 4 and of the filter tube 3 was 75 mm. The conveyor groove depth was approx. 1 mm, a width of 3 mm and 8 conveyor grooves 8 were arranged at the periphery.

Such screw filter presses are used for separating solid matter and liquid in suspensions. Such suspensions, which are often called solid matter suspensions, can be found in response to the fermenter slurry processing from biogas plants, for example, in slurry processing, in sewage sludge disposal, in vegetable oil pressing systems, in fruit juice production, in the recovery of recyclable material for process liquids, and in waste water cleaning and others.

To optimize the dehumidification, it may be necessary for the degree of dehumidification of the solid material pellets to be measured continuously or at certain intervals and for the speed of the screw shaft, for example, in the underpressure in the filtrate space to be regulated. The underpressure can be changed via a speed change of the exhaust pump or via an air inlet valve. This can be carried out manually or also via automatic regulations.

Figure 4A:
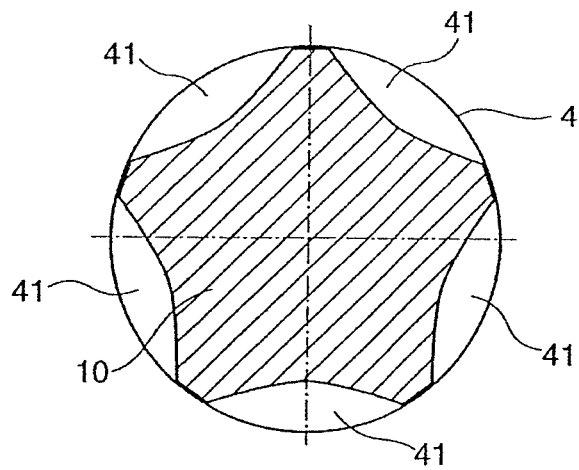
FIGS. 4a-c show sectional views through the screw coils in different axial layers along the screw coil.
Figure 4B:
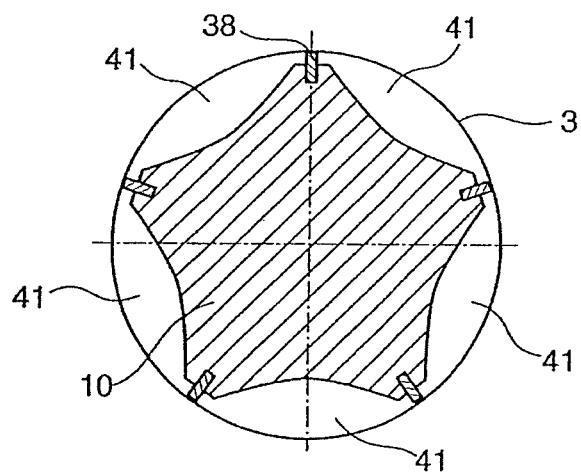
Figure 4C:
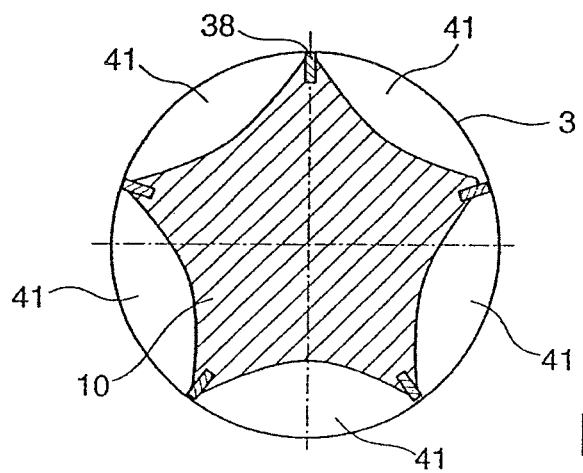

A further measure for improving the degree of dehumidification can be obtained from an exemplary embodiment as is illustrated in FIGS. 4a, b and c. FIGS. 4a to c in each case show radial sectional views through the screw shaft 10, in different axial positions relative to the screw shaft 10. FIG. 4a shows a section through the screw shaft 10 in the sliding area, in which the screw shaft 10 is surrounded by the sliding tube 4. The sliding tube 4 with the screw shaft 10 encloses a conveying space 41 along the coil turns, which helically surround the screw shaft 10. The filter tube 3 with the screw shaft 10 in each case encloses a conveying space 41 in the filter area as shown in FIGS. 4b and 4c. It is noted at this point that the radial section shown in FIG. 4b is located in the upper area along the filter area. FIG. 4c shows the screw shaft end which is surrounded by the filter tube 3 in axial viewing direction. It is important that the cross section of the conveying space 41 decreases from the lower screw shaft end in the direction of the upper screw shaft end. The condensing effect for the goods, which are to be conveyed upwards by the screw shaft, increases towards the top. A screw shaft designed in this manner is mainly suitable for drying or draining of suspensions, which contain easily compressible solid matter contents.

LIST OF REFERENCE NUMERALS 1 housing
2 center axis
3 filter tube
4 sliding tube
5 filtrate space
6 housing inner wall
7 filter tube outer wall
8 flange
9 housing flange
10 screw shaft
11 filtrate drain nozzle
12 valve
13 tube flange
14 coil/coil turn
15 drive motor/rotary drive
16 support plate
17 coupling
18 plate
19 hub
20 discharge opening
21 chute
22 housing nozzle
23 supply line
24 lower part of the housing
25 catch basin
26 connection
27 conveying grooves
28 upper part of the housing
29 shut-off valve
30 collar
31 flushing tube
32 strip
33 groove
34 attachment
35 nozzle
36 valve
38 elastic element
40 tube bank
42 source of below atmospheric pressure
41 conveying space
F filter area
G sliding area
S play
α pitch angle

The invention claimed is:

1. A screw filter press comprising:
a screw shaft including at least one coil turn and two screw shaft ends for driving a filtrate containing a suspension of solids upward upon rotation, a shaft axis of the screw shaft oriented parallel to a gravity vector and which is supported on one side via an upper screw shaft end which is connected to a rotary drive and which is enclosed coaxially, at least in a lower partial filter area, by a cylindrical filter tube, with openings and at which a filtrate space radially adjoins, to which underpressure is applied by an external source of underpressure below atmospheric pressure; and
a sliding tube, radially surrounding the screw shaft in a fluid-tight manner coaxial to the filter tube with an inner diameter equal to an inner diameter of the filter tube; and wherein
the sliding tube includes a discharge opening for solid filtrate at the upper screw shaft end, the equal inner diameter of the sliding tube and the filter tube causing the filtrate to flow during operation of the press, discharge of the solid filtrate with a controllable consistency, and the at least one coil turn of the screw shaft ending radially relative to the screw shaft in a flange which revolves helically around the screw shaft and which adjoins the filter tube at an inner wall thereof;
the underpressure below atmospheric pressure from the external source is applied to liquid filtrate in the filtrate space for drawing liquid from the liquid filtrate in the filtrate space in a start-up phase and after the start-up phase drawing liquid from the filtrate in a sliding area of the sliding tube.

2. The screw filter press comprising:
A screw shaft including at least one coil turn and two screw shaft ends for driving a filtrate containing a suspension of solids upward upon rotation, a shaft axis of the screw shaft oriented parallel to a gravity vector and which is supported on one side via an upper screw shaft end which is connected to a rotary drive and which is enclosed coaxially, at least in a lower partial filter area, by a cylindrical filter tube, with openings and at which a filtrate space radially adjoins, to which underpressure is applied by an external source of underpressure below atmospheric pressure; and
a sliding tube, radially surrounding the screw shaft in a fluid-tight manner coaxial to the filter tube with an inner diameter equal to an inner diameter of the filter tube; and wherein
the sliding tube includes a discharge opening for solid filtrate at the upper screw shaft end, the equal inner diameter of the sliding tube and the filter tube causing the filtrate to flow during operation of the press, discharge of the solid filtrate with a controllable consistency, and the at least one coil turn of the screw shaft ending radially relative to the screw shaft in a flange which revolves helically around the screw shaft and which adjoins the filter tube at an inner wall thereof;

the underpressure below atmospheric pressure from the external source is applied to liquid filtrate in the filtrate space for drawing liquid from the liquid filtrate in the filtrate space in a start-up phase and after the start-up phase drawing liquid from the filtrate in a sliding area of the sliding tube; and the sliding tub has a length which in the start-up phase causes the liquid in the liquid filtrate to be drawn from the filtrate space to form the solid filtrate in the sliding area which blocks the flow of air to the discharge opening.

3. The screw filter press according to claim 2, comprising:
an elastic wiping lip along the flange of the at least one coil turn in the filter area which adjoins the filter tube with a prestress at an inner wall.

4. The screw filter press according to claim 3, wherein:
the elastic wiping lip is an elastic abrasion-resistant material; and
the elastic wiping lip has a width of from 1-3 mm. and a height from 2-5 mm. which is elevated relative to the flange.

5. The screw filter press according to claim 3, wherein:
the elastic wiping lip is polyurethane.

6. The screw filter press according to claim 3, wherein:
the elastic wiping lip is prefabricated and glued into a groove extending along the flange.

7. The screw filter press according to claim 2, comprising:
radial play between the at least one coil turn of the screw shaft and the sliding tube.

8. The screw filter press according to claim 7, wherein:
the radial play between the at least one coil turn of the screw shaft and the sliding tube is between 0.1 and 0.3 mm.

9. The screw filter press according to claim 3, wherein:
speed of rotation of the rotary drive and underpressure in the filtrate space are regulated.

10. The screw filter press according to claim 2, comprising:
axial or spiral conveying grooves are disposed in an inner wall of the sliding tube.

11. The screw filter press according to claim 6, comprising:
axial or spiral conveying grooves are disposed in an inner wall of the sliding tube.

12. The screw filter press according to claim 2, wherein:
the screw shaft encompasses an odd number of coil turns.

13. The screw filter press according to claim 6, wherein:
the at least one coil turn encompasses a pitch angle ranging between 30°-50°, wherein the pitch angle is enclosed by a shaft axis and a coil turn.

14. The screw filter press according to claim 6, wherein:
the sliding tube has a tube length half of a length of the filter tube.

15. The screw filter press according to claim 9, wherein:
the sliding tube has a tube length half of a length of the filter tube.

16. The screw filter press according to claim 2, comprising:
a lower screw shaft end ending at a supply line; and
the filter tube is attached in a fluid tight manner to the supply line.

17. The screw filter press according to claim 2, wherein:
the at least one coil turn of the screw shaft with a filter and the sliding tube encloses a conveying space helically surrounding the screw shaft; and
the conveying space is larger in cross sectional area at the filter tube than at the sliding area.

18. The screw filter press according to claim 6, wherein:
the at least one coil turn of the screw shaft with a filter and the sliding tube encloses a conveying space helically surrounding the screw shaft; and
the conveying space is larger in cross sectional area at the filter tube than at the sliding area.

19. The screw filter press according to claim 9, wherein:
the at least one coil turn of the screw shaft with a filter and the sliding tube encloses a conveying space helically surrounding the screw shaft; and
the conveying space is larger in cross sectional area at the filter tube than at the sliding area.

20. The screw filter press according to claim 13, wherein:
the at least one coil turn of the screw shaft with a filter and the sliding tube encloses a conveying space helically surrounding the screw shaft; and
the conveying space is larger in cross sectional area at the filter tube than at the sliding area.

21. The screw filter press according to claim 16, wherein:
the at least one coil turn of the screw shaft with a filter and the sliding tube encloses a conveying space helically surrounding the screw shaft; and
the conveying space is larger in cross sectional area at the filter tube than at the sliding area.

22. The screw filter press according to claim 16, wherein:
a cross section of a conveyor space tapers continuously with increasing distance from the lower screw shaft end.

23. The screw filter press of claim 2 comprising:
a housing comprising a lower part and an upper part wherein in the lower part of the housing the filter tube is disposed coaxially to the screw shaft and the filtrate space is located between the filter tube and an inner wall of the housing; and
a pipe coupled to the lower part of the housing for connection to the external source of the underpressure below atmospheric pressure for drawing liquid from the filtrate space and from a solid cake.

* * * * *